US011598379B2

(12) United States Patent
Isobe

(10) Patent No.: US 11,598,379 B2
(45) Date of Patent: Mar. 7, 2023

(54) BIDIRECTIONAL TORQUE LIMITER

(71) Applicant: Origin Company, Limited, Saitama (JP)

(72) Inventor: Taro Isobe, Saitama (JP)

(73) Assignee: ORIGIN COMPANY, LIMITED, Saitama (JP)

(*) Notice: Subject to any disclaimer, the term of this patent is extended or adjusted under 35 U.S.C. 154(b) by 0 days.

(21) Appl. No.: 17/764,784

(22) PCT Filed: Dec. 24, 2019

(86) PCT No.: PCT/JP2019/050660
§ 371 (c)(1),
(2) Date: Mar. 29, 2022

(87) PCT Pub. No.: WO2021/065022
PCT Pub. Date: Apr. 8, 2021

(65) Prior Publication Data
US 2022/0373039 A1 Nov. 24, 2022

(30) Foreign Application Priority Data

Oct. 1, 2019 (JP) .............................. JP2019-181465

(51) Int. Cl.
*F16D 7/02* (2006.01)
(52) U.S. Cl.
CPC ..................................... *F16D 7/022* (2013.01)
(58) Field of Classification Search
CPC . F16D 7/02; F16D 7/021; F16D 7/022; F16D 41/20; F16D 41/206; F16D 43/211

USPC ........................................................ 464/30, 40
See application file for complete search history.

(56) References Cited

U.S. PATENT DOCUMENTS

| 3,618,730 | A | 11/1971 | Mould, III |
| 5,779,016 | A | 7/1998 | Kawasaki et al. |
| 7,712,592 | B2* | 5/2010 | Jansen ..................... F16D 7/022 464/40 |
| 7,766,774 | B2* | 8/2010 | Antchak .................. F16D 7/022 464/40 |
| 8,813,928 | B2* | 8/2014 | Schneider ............... F16D 7/022 474/94 |
| 9,309,935 | B2* | 4/2016 | Takada .................... F16D 41/206 |
| 9,702,412 | B2* | 7/2017 | Hurry ...................... F16D 7/022 |
| 9,982,721 | B2* | 5/2018 | Antchak ................. F16D 41/206 |

(Continued)

FOREIGN PATENT DOCUMENTS

| DE | 102011088904 A1 * | 6/2013 | ............ F16D 41/206 |
| DE | 202016003558 U1 * | 8/2016 | ............ F16D 41/206 |

(Continued)

OTHER PUBLICATIONS

International Search Report dated Mar. 10, 2020 in International (PCT) Application No. PCT/JP2019/050660.

(Continued)

*Primary Examiner* — Josh Skroupa
(74) *Attorney, Agent, or Firm* — Wenderoth, Lind & Ponack, L.L.P.

(57) ABSTRACT

A bidirectional torque limiter between an inner race and an outer race. A first hook portion (16) of a first coil spring (6) and a second hook portion (20) of a second coil spring (10) are to be fixed by an intermediate race (8) and an outer race (12), respectively.

8 Claims, 15 Drawing Sheets

(56) References Cited

U.S. PATENT DOCUMENTS

| | | | |
|---|---|---|---|
| 10,087,994 B2 * | 10/2018 | Serkh | F16D 7/022 |
| 10,125,854 B2 * | 11/2018 | Lingren | F16D 7/021 |
| 2016/0230866 A1 | 8/2016 | Lingren et al. | |

FOREIGN PATENT DOCUMENTS

| | | | | |
|---|---|---|---|---|
| DE | 102016209598 A1 * | 12/2017 | | F16D 7/022 |
| DE | 202018000857 U1 * | 7/2018 | | F16D 7/022 |
| JP | 04-307129 | 10/1992 | | |
| JP | 09053649 A * | 2/1997 | | F16D 7/022 |
| JP | 09166153 A * | 6/1997 | | F16D 7/02 |
| JP | 2002-87294 | 3/2002 | | |
| JP | 2002-155973 | 5/2002 | | |
| JP | 2002155973 A * | 5/2002 | | F16D 7/022 |
| JP | 2006-265982 | 10/2006 | | |
| JP | 2009-150509 | 7/2009 | | |
| JP | 2015-137732 | 7/2015 | | |
| JP | 2015-200062 | 11/2015 | | |
| WO | 2015/162659 | 10/2015 | | |

OTHER PUBLICATIONS

Office Action and Search Report dated Jul. 1, 2022 in corresponding Chinese Patent Application No. 201980100952.1, with English language translation.
Extended European Search Report dated Oct. 18, 20222, in corresponding European Patent Application No. 19948003.9.

* cited by examiner

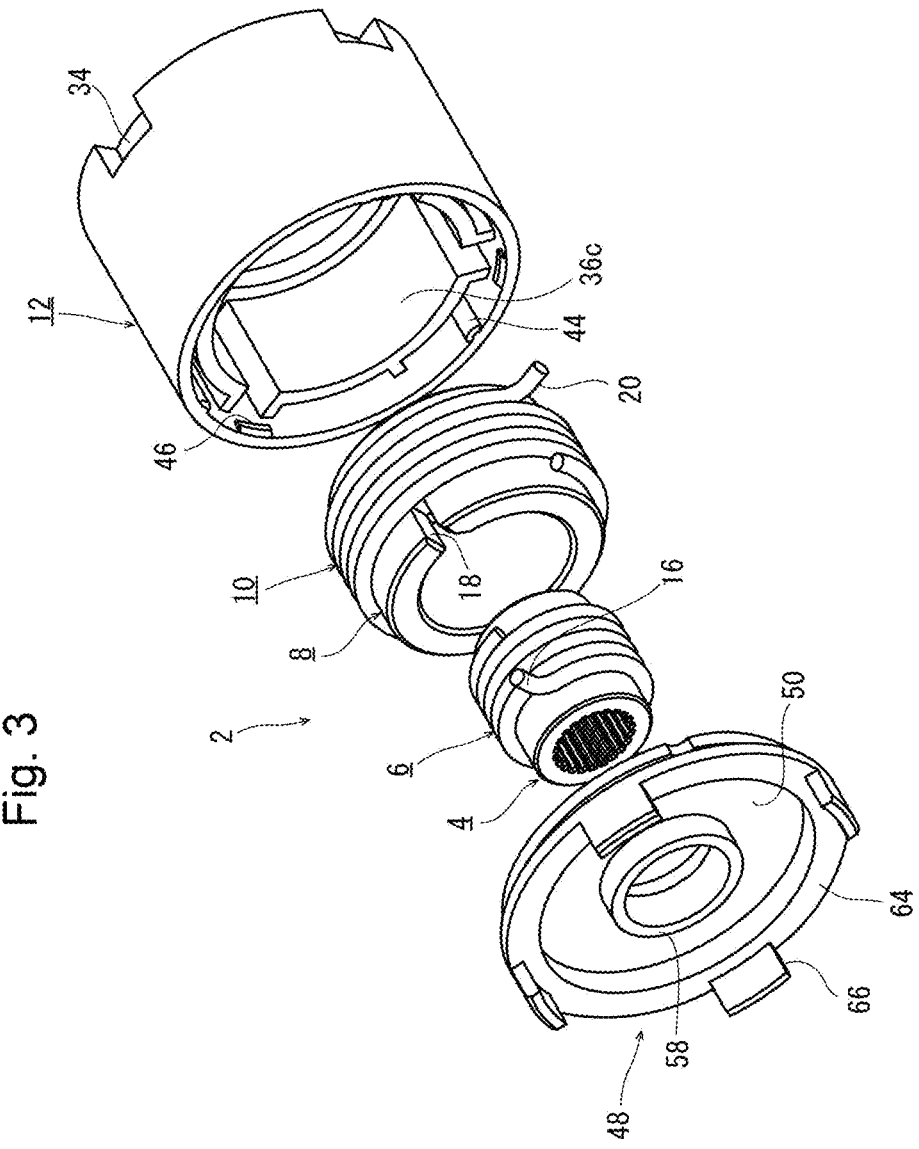

Fig. 4A
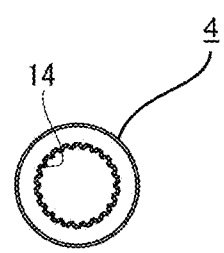
Fig. 4B
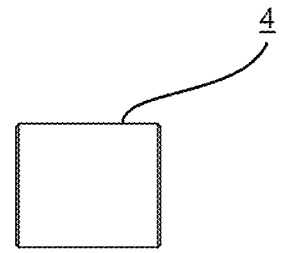
Fig. 5A
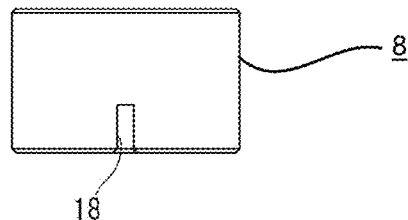
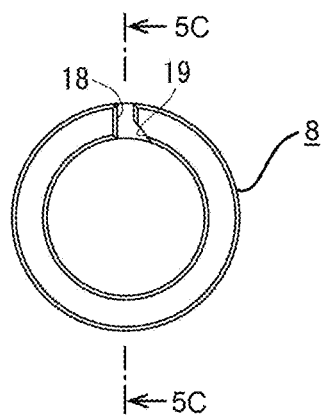
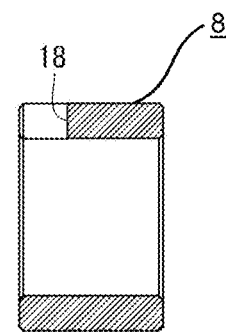
Fig. 5C
Fig. 5B Fig. 8A1
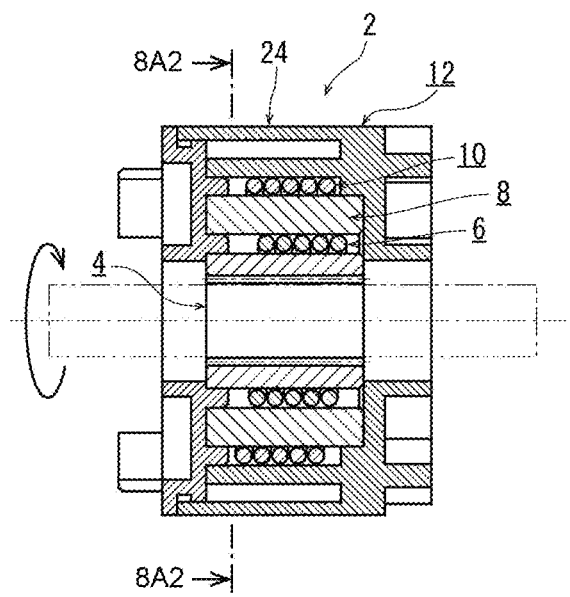
Fig. 8A2
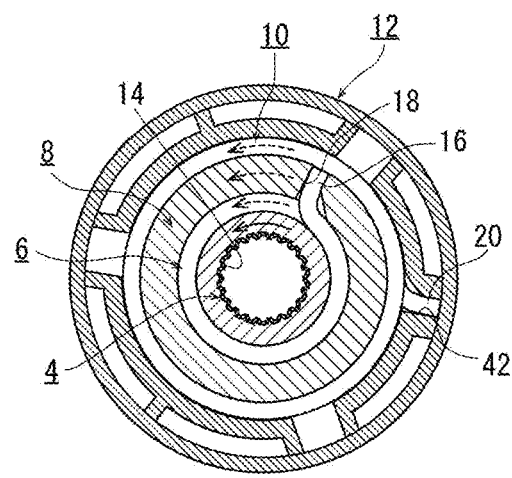
Fig. 8B1
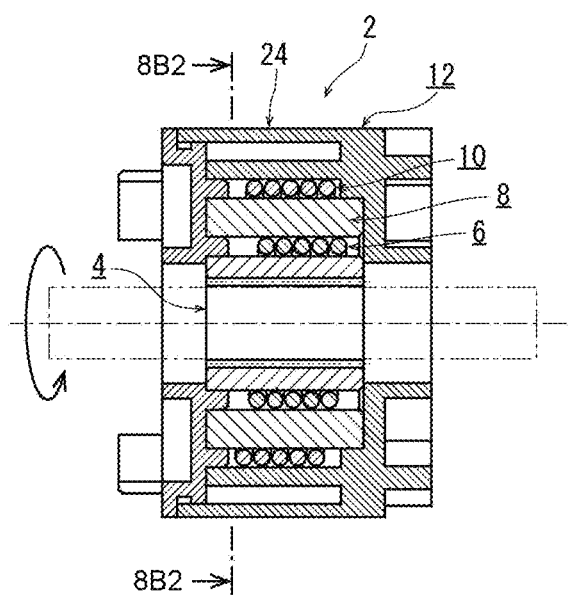
Fig. 8B2
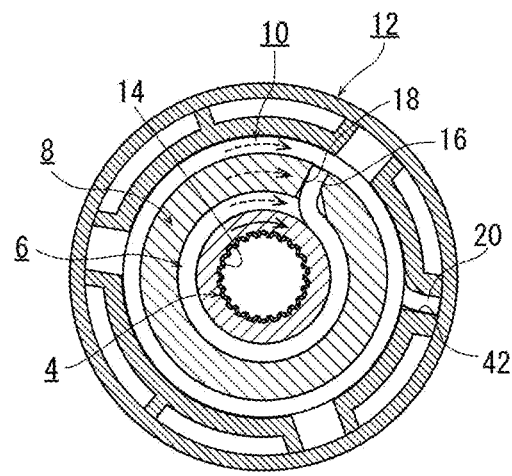

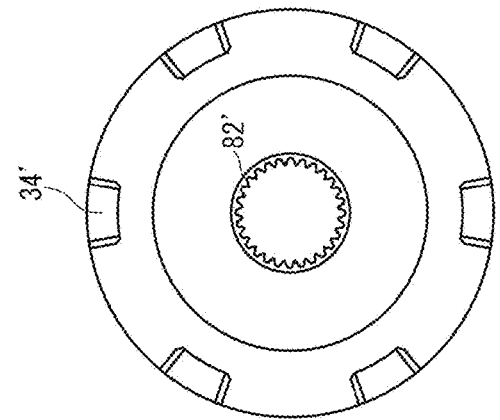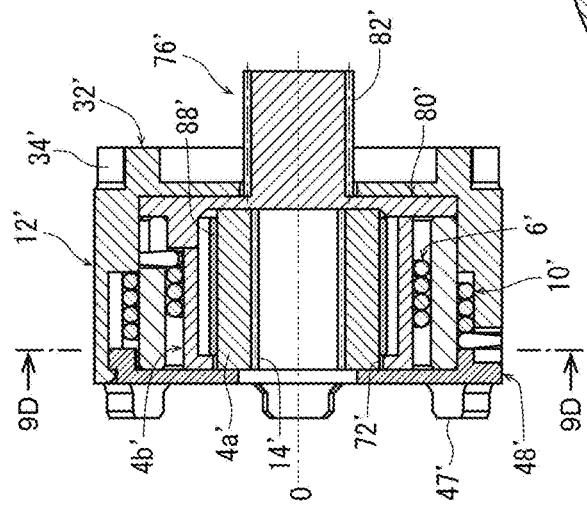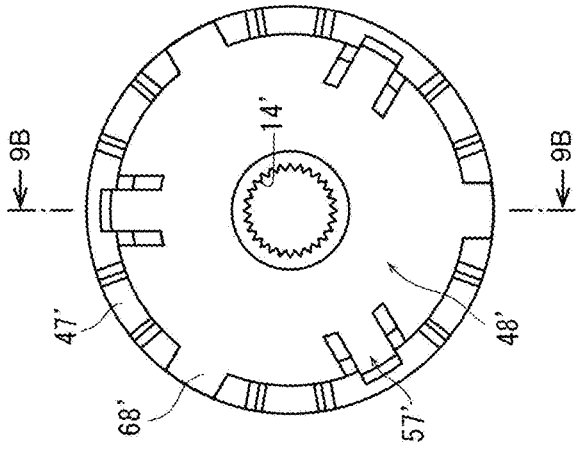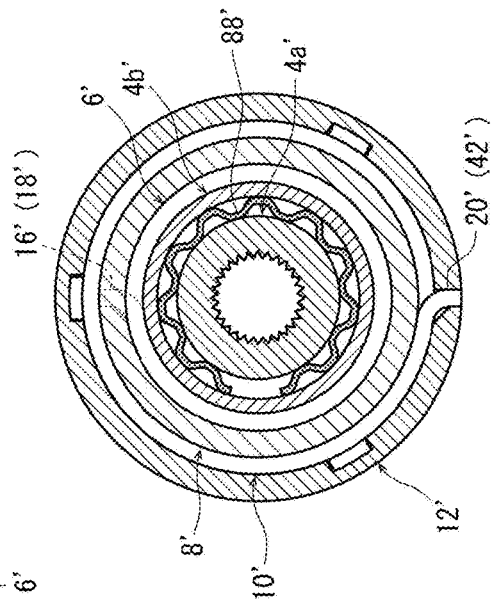

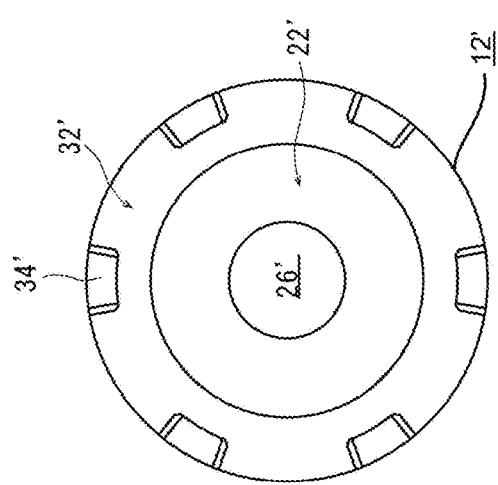
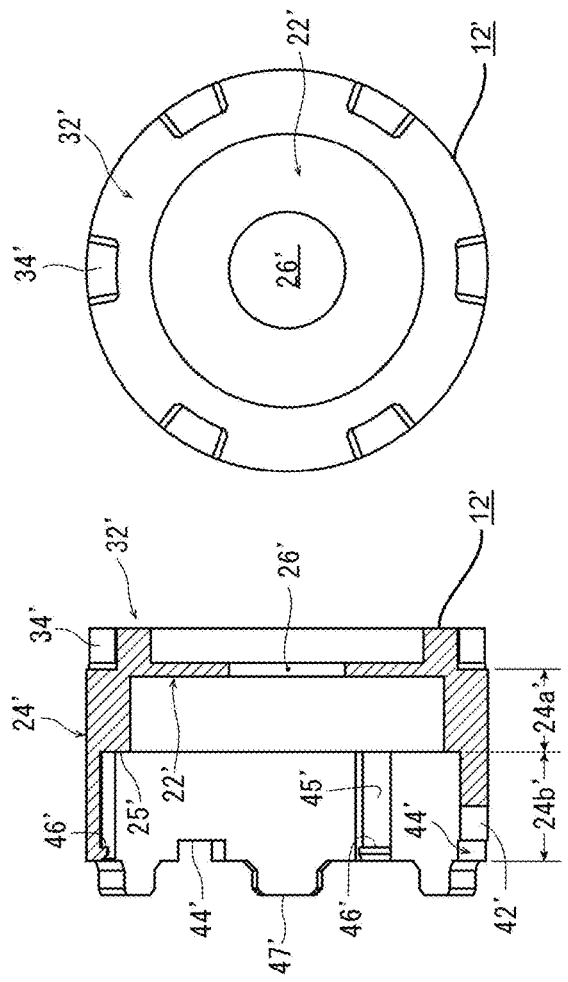
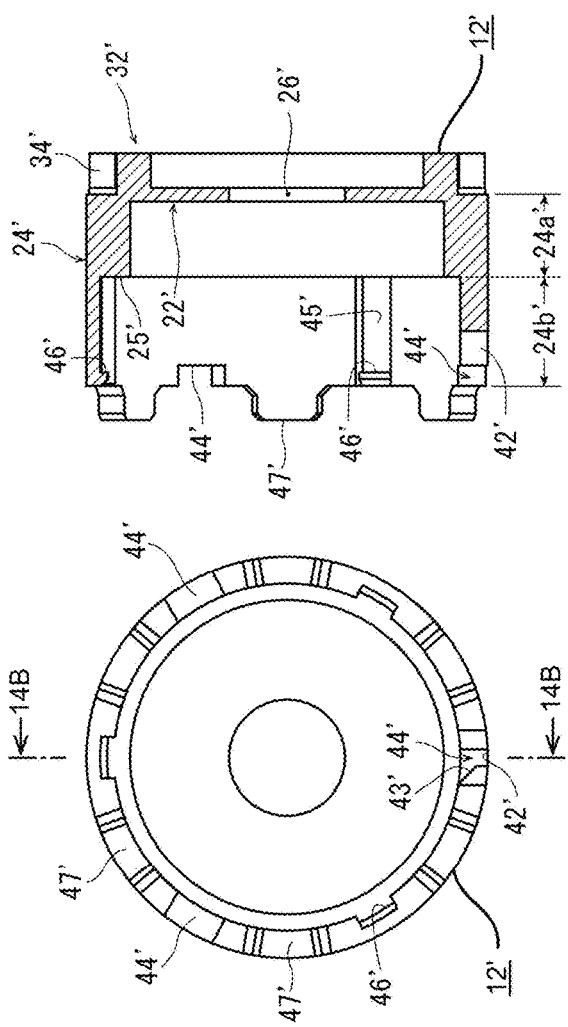

Fig. 15A
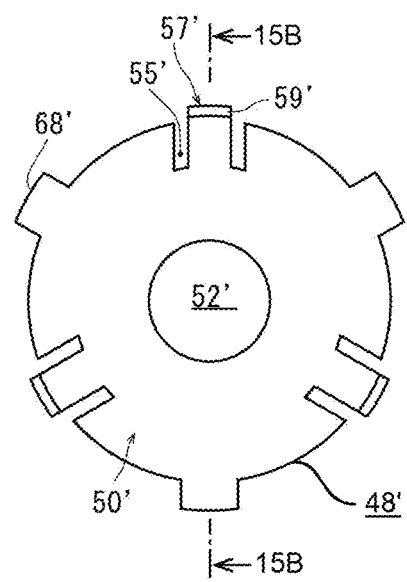
Fig. 15B
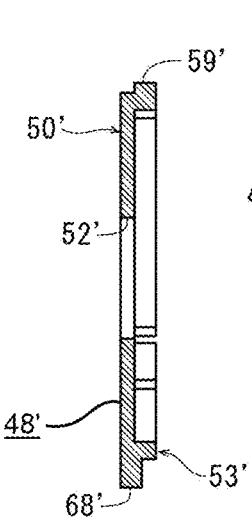
Fig. 15C
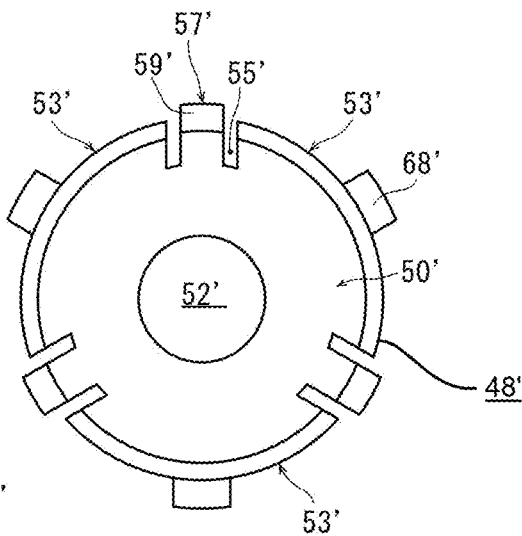
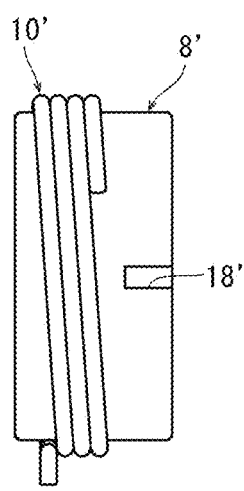
Fig. 16

Fig. 17A1
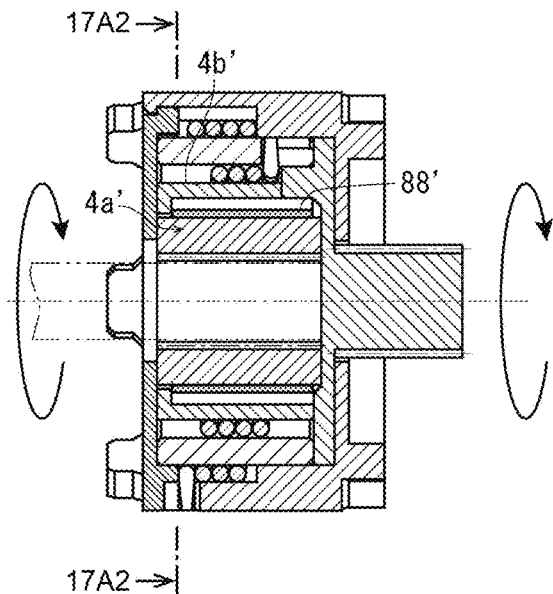
Fig. 17A2
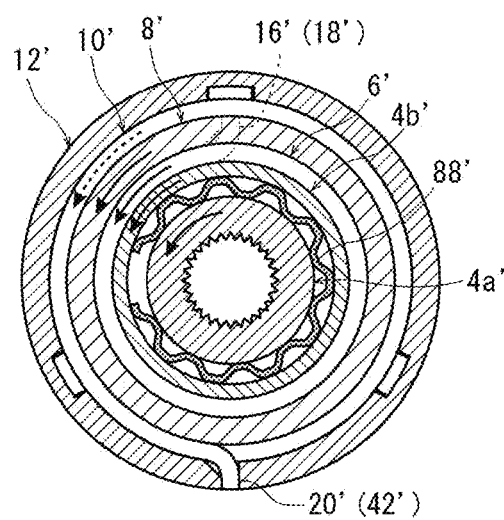
Fig. 17B1
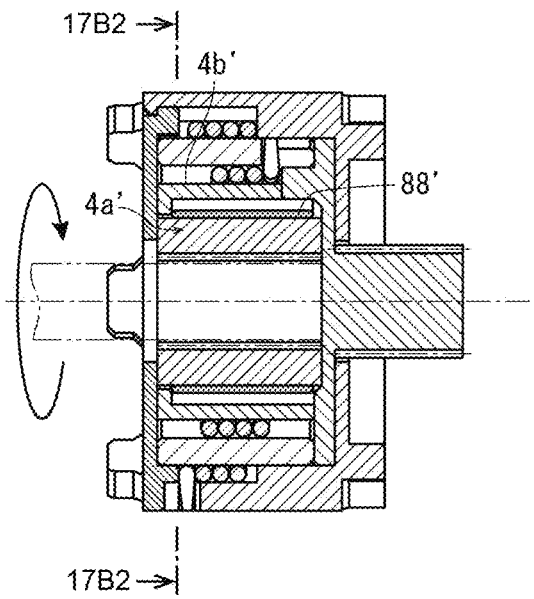
Fig. 17B2
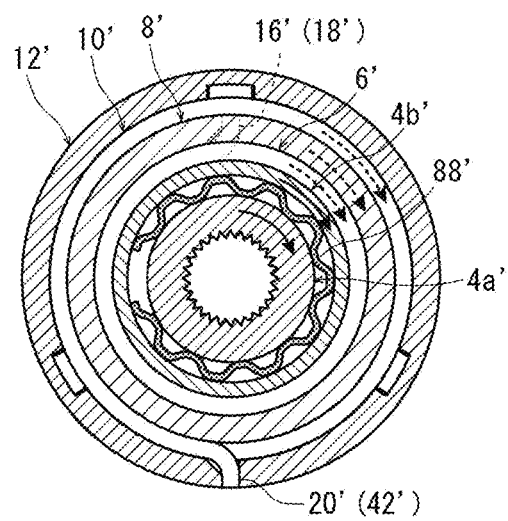

BIDIRECTIONAL TORQUE LIMITER

TECHNICAL FIELD

The present invention relates to a bidirectional torque limiter having two coil springs.

BACKGROUND ART

Some of jumping hatchbacks mounted on the rear end of vehicles such as a wagon or a van can be opened and closed by electric motor. Patent Document 1 below discloses a hatchback that is activated to switch (open/close) between the fully-opened position and the fully-closed position by an electric motor. When this hatchback is stopped at the fully-opened position or at any position between the fully-opened position and the fully-closed position, the hatchback is held by an electromagnetic clutch. In this switching apparatus if drive of the electric motor as the input-side device stops, the hatchback as an output-side device is held by the electromagnetic clutch, and this prevents the hatchback from falling by its own weight.

A bidirectional torque limiter can be employed as a component for holding a driven member (output-side device) like a hatchback at any suitable angular position, without relying on any electric means. Patent Document 2 below discloses an example of bidirectional torque limiter, which comprises: a cylindrical inner race; a first coil spring and a second coil spring both of which are formed by winding wires and mounted on the inner race so as to be in contact with the inner peripheral surface and the outer peripheral surface, respectively; a tubular outer race into which the inner race mounted with the first coil spring and the second coil spring is to be inserted; and an auxiliary member to apply rotation force with respect to the first coil spring. A first hook portion and a first groove portion are formed at the first coil spring and the auxiliary member, respectively. By inserting the first hook portion into the first groove portion, the first coil spring is engaged non-rotatably with respect to the auxiliary member. A second hook portion and a second groove portion are formed at the second coil spring and the outer race, respectively. By inserting the second hook portion into the second groove portion, the second coil spring is engaged non-rotatably with respect to the outer race. The direction to loosen the clamping force of the first coil spring by circumferentially pushing the first hook portion is opposite to the direction to loosen the clamping force of the second coil spring by circumferentially pushing the second hook portion when viewed from an axial direction. In a case where a rotation torque about the central axis for rotating the auxiliary member in one direction with respect to the outer race is applied and when the rotation torque is larger than a first predetermined value, the auxiliary member rotates with respect to the inner race by overcoming the frictional force between the first coil spring and the inner race. In a case where a rotation torque about the central axis for rotating the auxiliary member in the opposite direction with respect to the outer race is applied and when the rotation torque is larger than a second predetermined value, the inner race rotates with respect to the outer race by overcoming the frictional force between the second coil spring and the inner race.

In a case of using the bidirectional torque limiter as a component of an angular position holding mechanism of the hatchback, either the auxiliary member or the outer race is connected to the electric motor while the other is connected to the swing shaft of the hatchback. And the electric motor rotates in one direction at a rotation torque larger than the first predetermined value and in the opposite direction at a rotation torque larger than the second predetermined value, whereby the hatchback can be opened and closed. When the electric motor stops in a state where the hatchback is at the fully-opened position or an intermediate position, a rotation torque is applied to the connected member (the other component, i.e., either the auxiliary member or the outer race) by the weight of the hatchback. This rotation torque is smaller than the predetermined value (either the first predetermined value or the second predetermined value, depending on the rotation direction), the auxiliary member and the outer race turn to be incapable of rotating relatively, and thus, the hatchback is held at the fully-opened position or an intermediate position.

PRIOR ART DOCUMENTS

Patent Documents

Patent Document 1: JP-A 2006-265982
Patent Document 2: JP-A 2002-155973

SUMMARY OF THE INVENTION

Problem to be Solved by the Invention

As for the bidirectional torque limiter disclosed in Patent Document 2, the first hook portion is inserted into the first groove portion, so that the first coil spring is engaged with respect to the auxiliary member in a relatively non-rotatable manner. However, since the wire composing the first coil spring has an outer diameter smaller than the circumferential width of the first groove portion formed on the auxiliary member, there is a circumferential gap between the first coil spring and the auxiliary member. This can cause a rotational backlash between the auxiliary member and the outer race. Therefore, in a case where the bidirectional torque limiter disclosed in Patent Document 2 is used as a component of an angular position holding mechanism for the hatchback as described above, there can be a risk that the hatchback is vibrated with respect to the vehicle body by an external force like a wind when the hatchback is stopped at the fully-opened position or an intermediate position. This is unfavorable from the viewpoint of safety and service life.

The present invention has been made on the basis of the aforementioned facts, and a main object of the present invention for overcoming the problems is to provide a novel and improved bidirectional torque limiter free from rotational backlash between the inner race and the outer race.

Means for Solving the Problems

As a result of the intensive researches, the present inventors have found that the aforementioned main technical problems can be solved by fixing the first hook portion of the first coil spring and the second hook portion of the second coil spring by the intermediate race and the outer race, respectively.

Specifically, the present invention provides a bidirectional torque limiter for achieving the aforementioned technical object, and the bidirectional torque limiter includes: an inner race; a first coil spring formed of a wound wire mounted on the inner race so as to be in contact with the outer peripheral surface of the inner race; a tubular intermediate race into which the inner race mounted with the first coil spring is to be inserted; a second coil spring formed of a wound wire mounted on the intermediate race so as to be in contact with the outer peripheral surface of the intermediate race; and a tubular outer race into which the intermediate race mounted with the second coil spring is to be inserted. The inner race, the intermediate race and the outer race have a common central axis. The first coil spring has a first hook portion, and the first hook portion is fixed to the intermediate race so that the first coil spring is incapable of rotating with respect to the intermediate race. The second coil spring has a second hook portion, and the second hook portion is fixed to the outer race so that the second coil spring is incapable of rotating with respect to the outer race. A direction to loosen the clamping force of the first coil spring by circumferentially pushing the first hook portion is opposite to a direction to loosen the clamping force of the second coil spring by circumferentially pushing the second hook portion when viewed from an axial direction. Ina case where a rotation torque about the central axis to rotate the inner race in one direction with respect to the outer race is applied and when the rotation torque is larger than a first predetermined value, the inner race rotates with respect to the intermediate race by overcoming the frictional force between the first coil spring and the inner race. And, in a case where a rotation torque about the central axis to rotate the inner race in the opposite direction with respect to the outer race is applied and when the rotation torque is larger than a second predetermined value, the intermediate race rotates with respect to the outer race by overcoming the frictional force between the second coil spring and the intermediate race.

Preferably, the intermediate race has a first groove portion into which the first hook portion is to be inserted and held; and the outer race has a second groove portion into which the second hook portion is to be inserted and held. In this case, it is preferable that the wire composing the first coil spring has an outer diameter larger than the circumferential width of the first groove portion, and the first hook portion is press-fitted into the first groove portion. Further, it is preferable that the wire composing the second coil spring has an outer diameter larger than the circumferential width of the second groove portion, and the second hook portion is press-fitted into the second groove portion. Further, it is suitable that the second coil spring and the first groove portion are distanced from each other when viewed axially. Suitably, any one of the first predetermined value and the second predetermined value is set larger than the other. Suitably, a fluorine-based lubricant is encapsulated inside the outer race. Suitably, the inner race comprises an inner race internal member and an inner race external member, both of which are rotatable about the common central axis and each of which has an outer peripheral surface with a circular cross section. The inner race external member has an internal space with a circular cross section for housing the inner race internal member, and a rolled thin-plate elastic piece is interposed between the outer peripheral surface of the inner race internal member and the inner peripheral surface of the inner race external member such that the thin-plate elastic piece is brought into contact with both the inner peripheral surface and the outer peripheral surface. The inner race internal member and the inner race external member rotate integrally in a case where a rotation torque smaller than a third predetermined value is applied between the inner race internal member and the inner race external member. The inner race internal member rotates with respect to the inner race external member in a case where a rotation torque larger than the third predetermined value is applied between the inner race internal member and the inner race external member. And, the third predetermined value is larger than the first predetermined value and the second predetermined value.

Effect of the Invention

In the bidirectional torque limiter of the present invention, the first coil spring is incapable of rotating with respect to the intermediate race since the first hook portion is fixed to the intermediate race, while the second coil spring is incapable of rotating with respect to the outer race since the second hook portion is fixed to the outer race, and thus, there is no rotational backlash between the inner race and the outer race. Therefore, the bidirectional torque limiter of the present invention can be used as a component of an angular position holding mechanism for a hatchback in order to sufficiently reduce unfavorable vibrations of the hatchback caused by external force such as winds with respect to the vehicle body when the hatchback is stopped at the fully-opened position or an intermediate position.

BRIEF DESCRIPTION OF THE DRAWINGS

FIG. 3 is an exploded perspective view of the bidirectional torque limiter shown in FIGS. 1A-1D.

FIGS. 4A and 4B show the inner race of the bidirectional torque limiter shown in FIGS. 1A-1D.

FIGS. 5A and 5C show the intermediate race of the bidirectional torque limiter shown in FIGS. 1A-1D.

FIGS. 8A1, 8A2, 8B1 and 8B2 are views for explaining operations of the bidirectional torque limiter shown in FIGS. 1A-1-D with FIG. 8A2 being a cross sectional view along line 8A2-8A2 of FIG. 8A1, and FIG. 8B2 being a cross sectional view along line 8B2-8B2 of FIG. 8B1.

FIG. 9A is a left side view showing the entire structure of a bidirectional torque limiter configured according to the present invention in the second embodiment.

FIG. 9B is a cross sectional view along line 9B-9B of FIG. 9A.

FIG. 9C is a right side view showing the entire structure of a bidirectional torque limiter configured according to the present invention in the second embodiment.

FIG. 9D is a cross sectional view along line 9D-9D of FIG. 9B.

FIG. 14A is a left side view showing the outer race of the bidirectional torque limiter shown in FIGS. 9A-9D.

FIG. 14B is cross sectional view along line 14B-14B of FIG. 14A.

FIG. 14C is a right side view showing the outer race of the bidirectional torque limiter shown in FIGS. 9A-9D.

FIG. 14D is a plan view showing the outer race of the bidirectional torque limiter shown in FIGS. 9A-9D.

FIG. 15A is a left side view showing the shield plate of the bidirectional torque limiter shown in FIGS. 9A-9D.

FIG. 15B is a cross sectional view along line 15B-15B of FIG. 15A.

FIG. 15C is a right side view showing the shield plate of the bidirectional torque limiter shown in FIGS. 9A-9D.

FIG. 16 is a plan view showing a second coil spring mounted on the outer peripheral surface of the intermediate race.

FIGS. 17A1, 17A2, 17B1 and 17B2 are views for explaining operations of the bidirectional torque limiter shown in FIGS. 9A-9D with FIG. 17A2 being a cross sectional view along line 17A2-17A2 of FIG. 17A1, and FIG. 17B2 being a cross sectional view along line 17B2-17B2 of FIG. 17B1.

DETAILED DESCRIPTION OF THE EMBODIMENTS

Hereinafter, the present invention will be described in more detail with reference to the accompanying drawings that illustrate preferred embodiments of a bidirectional torque limiters configured in accordance with the present invention.

Figure 1C:
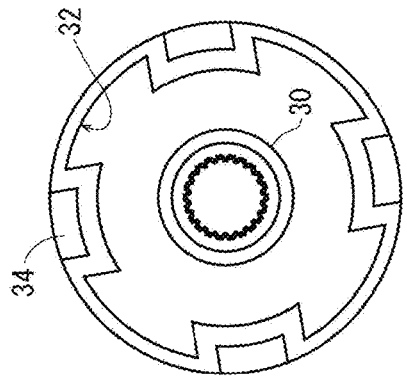
FIG. 1C is a right side view showing the entire structure of a bidirectional torque limiter configured according to the present invention in the first embodiment.
Figure 1B:
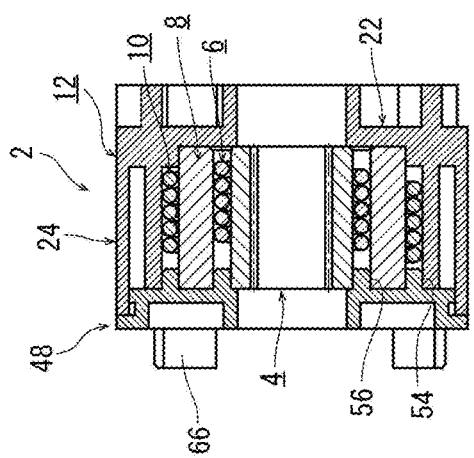
FIG. 1B is a plan view showing the entire structure of a bidirectional torque limiter configured according to the present invention in the first embodiment.
Figure 1D:
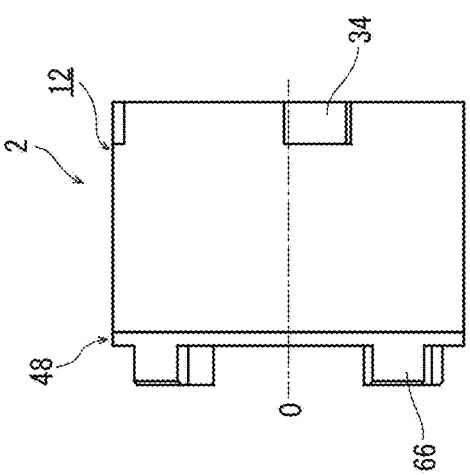
FIG. 1D is a cross sectional view along line 1D-1D of FIG. 1A.
Figure 1A:
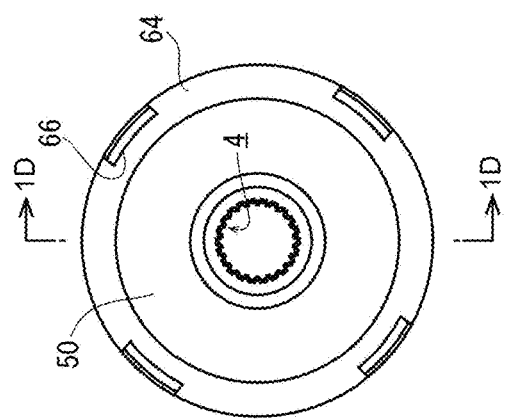
FIG. 1A is a left side view showing the entire structure of a bidirectional torque limiter configured according to the present invention in the first embodiment.

The first explanation is made referring to FIGS. 1A-8B2 for a first embodiment of the bidirectional torque limiter configured in accordance with the present invention.

The following explanation is made referring to FIGS. 1A-3. A bidirectional torque limiter, which is configured according to the present invention and denoted with numeral 2, has an inner race 4, a first coil spring 6, an intermediate race 8, a second coil spring 10, and an outer race 12. The inner race 4, the intermediate race 8 and the outer race 12 have a common central axis o. In FIG. 2A-2C, the first coil spring 6 and the second coil spring 10 are shadowed for clarification.

The following explanation is made referring to FIGS. 4A and 4B, together with FIGS. 1A-3. The inner race 4 made of metal has a cylindrical shape extending in the axial direction, such that the inner race 4 has an outer periphery with a circular cross section. A spline gear 14 is provided on the inner peripheral surface of the inner race 4. The inner race 4 is connected via the spline gear 14 to a drive shaft extending from a drive source like an electric motor. The drive shaft is connected to an output-side device like a hatchback and swings the output-side device.

As shown in FIGS. 1A-3, the first coil spring 6 is formed by winding a metal wire and mounted on the inner race 4 so as to be in contact with the outer peripheral surface. At one axial end of the first coil spring 6, a first hook portion 16 extending linearly in the radial direction is formed. The inner diameter of the first coil spring 6 in its free state is smaller than the outer diameter of the inner race 4. Therefore, when the first coil spring 6 is mounted on the outer peripheral surface of the inner race 4, the first hook portion 16 is pressed in the direction to loosen the first coil spring 6 so that the diameter is somewhat increased. In this state, the inner race 4 is inserted into be disposed inside the first coil spring 6, followed by allowing the increased diameter of the first coil spring 6 to be decrease. Thus the first coil spring 6 is brought into close contact with the outer peripheral surface of the inner race 4.

The following explanation is made referring to FIGS. 5A-5C, together with FIGS. 1A-3. The intermediate race 8 made of metal has a cylindrical shape extending in the axial direction, into which the inner race 4 mounted with the first coil spring 6 is inserted. At the one axial end of the intermediate race 8, a first groove portion 18 extending linearly in the axial direction and penetrating in the radial direction is formed. This indicates that the cross sections of both the outer periphery and inner periphery of the intermediate race 8 are shaped circular excepting the area where the first groove portion 18 is formed. As described above, since the inner race 4 mounted with the first coil spring 6 is to be inserted into the intermediate race 8, the intermediate race 8 has an inner diameter somewhat larger than the outer diameter of the first coil spring 6 in close contact with the outer peripheral surface of the inner race 4. On one of the circumferential side faces of the radially inner end portion of the first groove portion 18, a relief portion 19 is formed. The relief portion 19 is provided for avoiding interference with the proximal end portion of the first hook portion 16 of the first coil spring 6 that will be inserted herein to be held as described below. The relationship between the first hook portion 16 and the first groove portion 18 will be further mentioned later.

As shown in FIGS. 1A-3, the second coil spring 10 is formed by winding a metal wire, and mounted on the intermediate race 8 to be in contact with the outer peripheral surface. At the other axial end of the second coil spring 10, a second hook portion 20 extending linearly in the radial direction is formed. The inner diameter of the second coil spring 10 in its free state is smaller than the outer diameter of the intermediate race 8. Therefore, at the time of mounting the second coil spring 10 on the outer peripheral surface of the intermediate race 8, the second hook portion 20 is pressed in the direction for loosening the second coil spring 10 to somewhat increase the diameter, and then, the intermediate race 8 is inserted into the second coil spring 10 and disposed there. After that, by allowing the increased diameter of the second coil spring 10 to be decreased. In this manner, the second coil spring 10 is brought into close contact with the outer peripheral surface of the intermediate race 8.

Here, the direction to loosen the clamping force of the first coil spring 6 by circumferentially pushing the first hook portion 16 and the direction to loosen the clamping force of the second coil spring 10 by circumferentially pushing the second hook portion 20 are set to be opposite each other when viewed from one axial direction. As being understandable by referring to FIGS. 2A-3, in the illustrated embodiment, the wires each composing the first coil spring 6 and the second coil spring 10 are wound in the same direction (clockwise) when viewed from the side where each of the hook portions is formed axially. The first coil spring 6 and the second coil spring 10 are disposed so that the first hook portion 16 and the second hook portion 20 are positioned opposite to each other in the axial direction. Therefore, the direction to loosen the clamping force of the first coil spring 6 by circumferentially pushing the first hook portion 16 and the direction to loosen the clamping force of the second coil spring 10 by circumferentially pushing the second hook portion 20 are set to be opposite to each other when viewed from the one axial direction. As desired, it is also possible to dispose the first coil spring and the second coil spring so that winding directions of the wires each composing the first coil spring and the second coil spring are set to be opposite to each other and both the first hook portion and the second hook portion are positioned at one side in the axial direction.

The following explanation is made by referring to FIGS. 6A-6D together with FIGS. 1A-3. The outer race 12 made of a synthetic resin comprises an end plate portion 22 that is perpendicular to the axial direction, and a tubular outer race main portion 24 extending axially from the outer peripheral edge of the end plate portion 22. Inside the outer race main portion 24, the intermediate race 8 equipped with the second coil spring 10 is to be inserted. In the illustrated embodiment, the inner race 4 equipped with the first coil spring 6 is also inserted. In the side view, the end plate portion 22 is circular (when viewed in the axial direction), and a circular through hole 26 extending axially is formed at its center. On the axial inner side face of the end plate portion 22, a circularly-recessed portion 28 having a diameter larger than the through hole 26 is formed coaxially with the through hole 26. As shown in the line 1D-1D cross section of FIG. 1D, the axial other end portion of the intermediate race 8 is inlayed into the recessed portion 28. At the center of the axial outer side face of the end plate portion 22, a cylindrical wall 30 is provided to surround the outer peripheral edge of the through hole 26 and to extend axially. At the outer peripheral edge portion of the end plate portion 22, a tubular connection wall 32, which surrounds the cylindrical wall 30 and stands axially, is provided. The connection wall 32 is entirely cylindrical and arranged along the outer peripheral edge of the end plate portion 22. At the required circumferential positions, recessed areas 34 displaced radially inward are provided. Each recessed area 34 has a substantially U-shape in a side view. Here, four recessed areas 34 are formed in the circumferential direction at equiangular intervals. The recessed areas 34 serve to fix the bidirectional torque limiter 2 itself to an external device.

The outer race main portion 24 is cylindrical, and on its inner peripheral surface, four inner walls 36a-36d extending circumferentially are provided respectively at intervals in the circumferential direction. Each of the four inner walls 36a-36d has a main portion that is somewhat distanced radially inward from the inner peripheral surface of the outer race main portion 24 and extends in an arc along the inner peripheral surface of the outer race main portion 24, and an end portion each extending linearly at the circumferential both ends of the main portion radially outward to be connected to the inner peripheral surface of the outer race main portion 24. The inner peripheral surfaces of the main portions of the four inner walls 36a-36d are on the periphery of a common virtual circle 38 indicated with a chain-double-dashed line in FIG. 6A. As mentioned above, since the intermediate race 8 equipped with the second coil spring 10 is to be inserted inside the outer race main portion 24, the virtual circle 38 has a diameter somewhat larger than the outer diameter of the second coil spring 10 in a close contact with the outer peripheral surface of the intermediate race 8. Each of the four inner walls 36a-36d extends from the end plate portion 22 to the open axial end portion of the outer race main portion 24. The inner walls 36a and 36b have the same and relatively short circumferential length, while the inner walls 36c and 36d have the same and relatively long circumferential length. Between the inner wall 36b and the inner wall 36c, between the inner wall 36c and the inner wall 36d, and between the inner wall 36d and the inner wall 36a, gaps 40 having the same length relatively long in the circumferential direction are formed. On the other hand, between the inner wall 36a and the inner wall 36b, a gap that is relatively short in the circumferential direction is formed to provide a second groove portion 42. Therefore, the second groove portion 42 extends in the axial direction. One of the circumferential side faces at the radially inner end portion of the second groove portion 42 has a relief portion 43 as mentioned below. The relief portion 43 serves to avoid interference with the proximal end portion of the second hook portion 20 of the second coil spring 10 to be inserted and held therein, as described below. The relationship between the second hook portion 20 and the second groove portion 42 will be specified later. On the inner peripheral surface at the opened axial end portion of the outer race main portion 24, locking protrusions 44 and engaging claws 46 both protruding radially inward are also provided. Here, three locking protrusions 44 are provided at equiangular intervals in the circumferential direction, and each of the locking protrusions has an arc cross section. Each of the engaging claws 46 is provided at a position to match the gap 40 in the circumferential direction. Therefore, in the illustrated embodiment, three engaging claws 46 are provided. Preferably, a fluorine-based lubricant is encapsulated in the outer race main portion 24.

After disposing the inner race 4, the first coil spring 6, the intermediate race 8 and the second coil spring 10 inside the outer race main portion 24, the opened axial end of the outer race main portion 24 is blocked with the shield plate 48. The following explanation is made referring to FIGS. 7A-7D together with FIGS. 1A-3. The shield plate 48 made of a synthetic resin has a circular end plate portion 50. At the center of the end plate portion 50, a circular through hole 52 is formed. On one axial side face of the end plate portion 50, an external cylindrical wall 54 and an internal cylindrical wall 56 are provided coaxially with the through hole 52. As mentioned later, the shield plate 48 is assembled with the outer race 12. And then, as shown as the line 1D-1D cross section in FIG. 1D, the external cylindrical wall 54 is inlayed between the intermediate race 8 and the inner walls 36a-36d of the outer race 12, thereby restricting the second coil spring 10 from shifting in the axial direction. Meanwhile, the internal cylindrical wall 56 is inlayed between the intermediate race 8 and the inner race 4 so as to restrict the first coil spring 6 from shifting in the axial direction. On the axial other side face of the end plate portion 50, a cylindrical wall 58 is provided along the outer peripheral edge of the through hole 52. Furthermore, on this axial other side face of the end plate portion 50, a tubular outer peripheral wall 60 that stands in the axial direction along the outer peripheral edge is provided. The outer peripheral wall 60 has a cylindrical proximal end portion 62 extending axially from the end plate portion 50 and an annular flange portion 64 extending radially outward at the axial extending end of the proximal end portion 62. The proximal end portion 62 extends in the axial direction from the end plate portion 50 on the somewhat radially inside the outer peripheral edge of the end plate portion 50. At the outer peripheral edge portion of the flange portion 64, four arc protrusions 66 protruding axially are provided at equiangular intervals. On the outer peripheral surface of the end plate portion 50, three arc notches 68 are formed at equiangular intervals in the circumferential direction. The following explanation is made referring to also FIGS. 6A-6D. The shield plate 48 matches the end face at the opened axial end of the outer race main portion 24 of the outer race 12. In this state, the shield plate 48 is enforced in the axial direction toward the end plate portion 22 with respect to the outer race main portion 24, thereby being assembled with the outer race 12. In other words, the end plate portion 50 gets over elastically the engaging claws 46 formed at the outer race main portion 24 and enters inside the outer race main portion 24, while the outer peripheral edge portion of the end plate portion 50 opposes the axial end faces of the inner walls 36*a*-36*d* and also is engaged axially by the engaging claws 46, whereby the shield plate 48 is prevented from dropping out from the outer race 12. Further, the notches 68 engage with the locking protrusions 44 formed at the outer race main portion 24, so that the shield plate 48 is prevented from rotating with respect to the outer race 12.

Figure 2A:
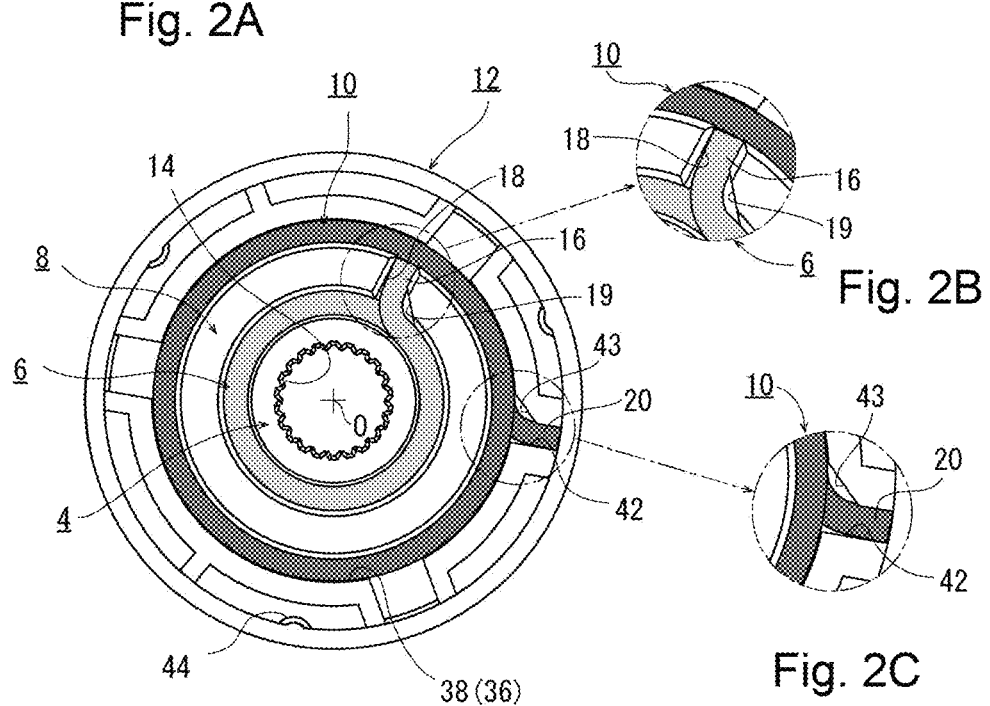
FIG. 2A is a left side view showing the bidirectional torque limiter shown in FIG. 1A, from which a shield plate is omitted.
Figure 2B:
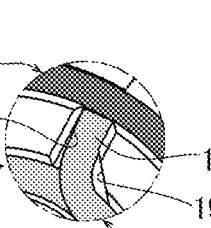
FIGS. 2B and 2C are magnified views of portions of the bidirectional torque limiter shown in FIG. 2A.
Figure 2C:
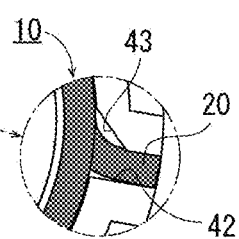
Figure 6C:
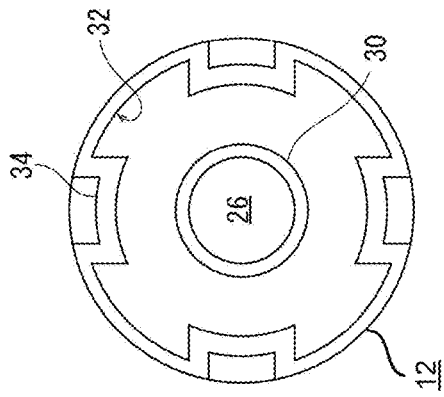
FIG. 6C is a right side view showing the outer race of the bidirectional torque limiter shown in FIGS. 1A-1D.
Figure 6B:
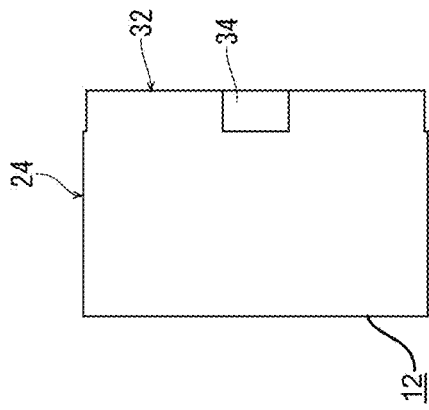
FIG. 6B is a plane view showing the outer race of the bidirectional torque limiter shown in FIGS. 1A-1D.
Figure 6D:
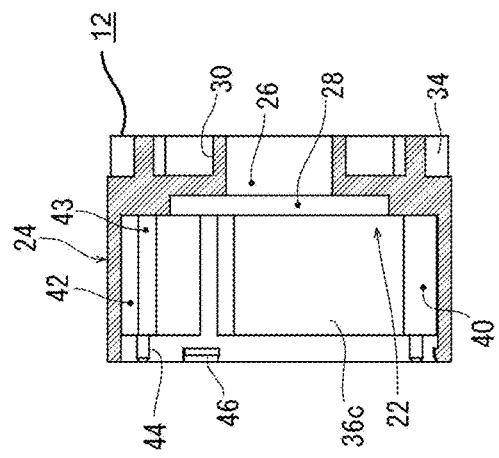
FIG. 6D is a cross sectional view along line 6D-6D of FIG. 6A.
Figure 6A:
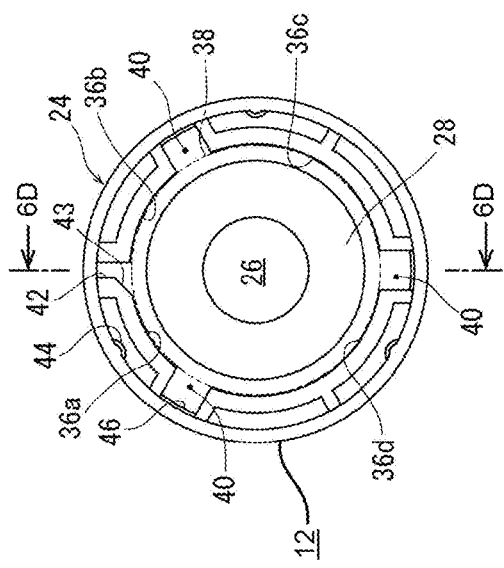
FIG. 6A is a left side view showing the outer race of the bidirectional torque limiter shown in FIGS. 1A-1D.
Figure 7A:
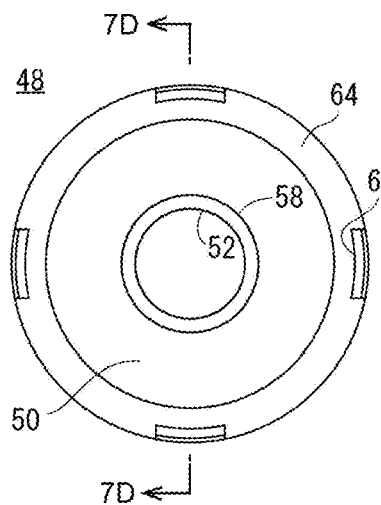
FIG. 7A is a left side view showing the shield plate of the bidirectional torque limiter shown in FIGS. 1A-1D.
Figure 7B:
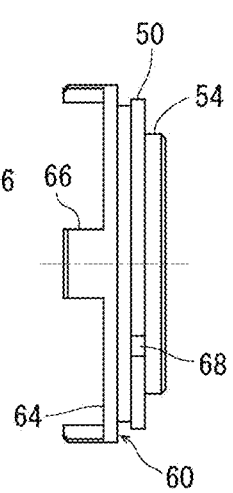
FIG. 7B is a plan view showing the shield plate of the bidirectional torque limiter shown in FIGS. 1A-1D.
Figure 7C:
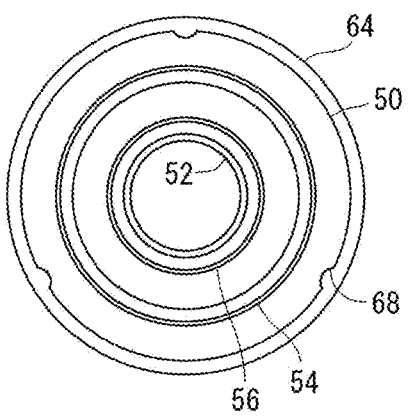
FIG. 7C is a right side view showing the shield plate of the bidirectional torque limiter shown in FIGS. 1A-1D.
Figure 7D:
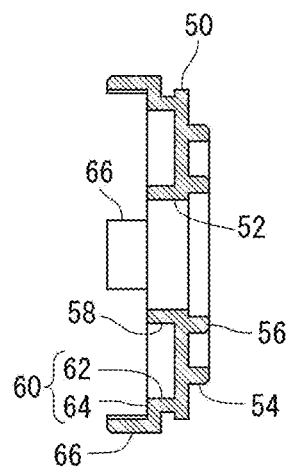
FIG. 7D is a cross sectional view along line 7D-7D of FIG. 7A.

Here, as shown in in FIGS. 2A-2C, in the bidirectional torque limiter configured according to the present invention, it is important that the first coil spring 6 is not rotatable with respect to the intermediate race 8 since the first hook portion 16 is fixed to the intermediate race 8, and the second coil spring 10 is not rotatable with respect to the outer race 12 since the second hook portion 20 is fixed to the outer race 12. In the illustrated embodiment, a first groove portion 18 is formed on the intermediate race 8 so that the first hook portion 16 is inserted and held in the first groove portion 18. The wire composing the first coil spring 6 has an outer diameter larger than the circumferential width of the first groove portion 18, so that the first hook portion 16 is pressed into the first groove portion 18. Similarly, a second groove portion 42 is formed on the outer race 12 so that the second hook portion 20 is inserted and held in the second groove portion 42. The wire composing the second coil spring 10 has an outer diameter larger than the circumferential width of the second groove portion 42, so that the second hook portion 20 is pressed into the second groove portion 42. Therefore, there is no gaps either at the first hook portion 16 in the first groove portion 18 or at the second hook portion 20 in the second groove portion 42, respectively. As desired, pressing the hook portion into the groove portion can be omitted. Instead, the hook portion can be held at the groove portion. For this purpose, the hook portion is fixed to the groove portion by any suitable fixing means like an adhesive in a state where the hook portion is inserted in the groove portion. As described above, in the illustrated embodiment, the outer race 12 is made of a synthetic resin. When the outer race 12 is made of metal, the fixing can be carried out by spot welding. Alternatively, the hook portion can be fixed to either the intermediate race 8 or the outer race 12 by the aforementioned fixing means without forming a groove portion on either the intermediate race 8 or the outer race 12.

Next, the operations of the bidirectional torque limiter 2 will be explained below by referring to FIGS. 8A1, 8A2, 8B1 and 8B2 together with FIGS. 1A and 2C.

Here, the inner race 4 is connected to a rotation shaft (indicated with a chain-double-dashed line in FIGS. 8A1 and 8B1) of a drive source (input-side device) like an electric motor. In a case where this inner race 4 rotates counterclockwise when viewed from the left in the central front view of FIG. 1A (hereinafter, this is described as "one direction" in the illustrated embodiment), the components start integrally rotating in the same direction, namely, the one direction, due to the following reasons. That is, the first coil spring 6 is mounted on the inner race 4 to be in contact with the outer peripheral surface, the intermediate race 8 holds the first hook portion 16 of the first coil spring 6, the second coil spring 10 is mounted on the intermediate race 8 to be in contact with the outer peripheral surface, and the outer race 12 holds the second hook portion 20 of the second coil spring 10. At that time, since the outer race 12 is fixed, the first hook portion 16 of the first coil spring 6 is applied relatively with a clockwise reactive force at the first groove portion 18 by the intermediate race 8, while the second hook portion 20 of the second coil spring 10 is applied relatively with a clockwise reactive force at the second groove portion 42 by the outer race 12. As mentioned above, the direction to loosen the clamping force of the first coil spring 6 by circumferentially pushing the first hook portion 16 and the direction to loosen the clamping force of the second coil spring 10 by circumferentially pushing the second hook portion 20 are set opposite to each other when viewed from one axial direction. This indicates that, when the inner race 4 rotates in the one direction (counterclockwise), the first hook portion 16 of the first coil spring 6 is to be applied with a reactive force relatively in an opposite direction (clockwise) at the first groove portion 18 of the intermediate race 8 while the second hook portion 20 of the second coil spring 10 is also to be applied with a reactive force relatively in an opposite direction (clockwise) at the second groove portion 42 of the outer race 12. The reactive force acts in a direction to loosen the first coil spring 6 at the first hook portion 16 of the first coil spring 6, and in a direction to clamping the second coil spring 10 at the second hook portion 20 of the second coil spring 10, respectively. This indicates that, when a rotation torque about the central axis to rotate the inner race 4 in the one direction with respect to the outer race 12, the inner race 4 cannot rotate due to the frictional force between the first coil spring 6 and the inner race 4 in a case where the rotation torque is equal to or smaller than a first predetermined value. In other words, the angular position of the output-side device like a hatchback connected to the inner race 4 will be held. In contrast, in a case where the rotation torque is larger than the first predetermined value, as shown in FIGS. 8A1 AND 8A2, the inner race 4 rotates with respect to the first coil spring 6, namely, with respect to the intermediate race 8, by overcoming the frictional force between the first coil spring 6 and the inner race 4. That is, the output-side device like a hatchback connected to the inner race 4 may rotate in the one direction.

In contrast to the aforementioned case where the inner race 4 rotates in the one direction, in a case where the inner race 4 rotates clockwise (opposite direction) when viewed from the left in the front view and the longitudinally sectioned view of FIGS. 1A-1D, the first hook portion 16 of the first coil spring 6 is applied with a reactive force in a direction for clamping the first coil spring 6 while the second hook portion 20 of the second coil spring 10 is applied with a reactive force in a direction for loosening the second coil spring 10. This indicates that, when a rotation torque about the central axis for rotating the inner race 4 in the opposite direction with respect to the outer race 12 is applied, the inner race 4 cannot rotate due to the frictional force between the second coil spring 10 and the intermediate race 8 in a case where the rotation torque is equal to or smaller than a second predetermined value. Namely, the angular position of the output-side device like a hatchback connected to the inner race 4 will be held. On the other hand, in a case where the rotation torque is larger than the second predetermined value, as shown in FIGS. 8B1 and 8B2, the intermediate race 8 rotates with respect to the second coil spring 10 by overcoming the frictional force between the second coil spring 10 and the intermediate race 8. Namely, the output-side device like a hatchback connected to the inner race 4 will rotate in the opposite direction.

The first predetermined value can be suitably set by the magnitude of force that the first coil spring 6 clamps the inner race 4. Similarly, the second predetermined value can be suitably set by the magnitude of force that the second coil spring 10 clamps the intermediate race 8. That is, it is possible to adjust the first predetermined value and the second predetermined value by suitably setting the inner diameters of the first coil spring 6 and the second coil spring 10, stiffness (material) of the wires, wire diameters (outer diameter of the wire) and the like. For this reason, in a case where the output-side device is a hatchback or the like that vertically swings, preferably the first predetermined value is set to be larger or smaller than the second predetermined value, so that the output-side device is prevented from swinging to close by its own weight at the time of stopping the output-side device at the fully-opened position or an intermediate position, while excessive resistance can be prevented at a time that the output-side device is swung to open by the electric motor.

In the bidirectional torque limiter of the present invention, the first coil spring 6 is engaged to be incapable of relatively rotating with respect to the intermediate race 8 in a state where the first hook portion 16 is held by the first groove portion 18 formed on the intermediate race 8, while the second coil spring 10 is engaged to be incapable of relatively rotating with respect to the outer race 12 in a state where the second hook portion 20 is held by the second groove portion 42 formed on the outer race 12. As a result, there is no rotational backlash between the inner race 4 and the outer race 12. Therefore, by using the bidirectional torque limiter of the present invention as a component for holding the hatchback's angular position, it is sufficiently possible to prevent or reduce unfavorable vibration caused by the hatchback to the entire vehicle due to any external force like winds at the time the hatchback is stopped at the fully-opened position or an intermediate position.

In the aforementioned embodiment, the drive shaft extending from the input-side device is connected to the output-side device via the bidirectional torque limiter 2. Alternatively, the connection can be modified to that of a bidirectional torque limiter 2' in the second embodiment of the present invention. Specifically, it is possible that either the inner race or the outer race is connected to the input-side device while the other is connected to the output-side device.

The following explanation is made referring to FIGS. 9A-17B2 for the second embodiment of the bidirectional torque limiter configured according to the present invention. The bidirectional torque limiter in the second embodiment has further an overload prevention mechanism provided to the inner race of the bidirectional torque limiter in the first embodiment. Hereinafter, each component the same as that in the aforementioned first embodiment of the present invention is indicated with the identical number plus "'", and a detailed explanation therefor will be omitted.

Figure 10:
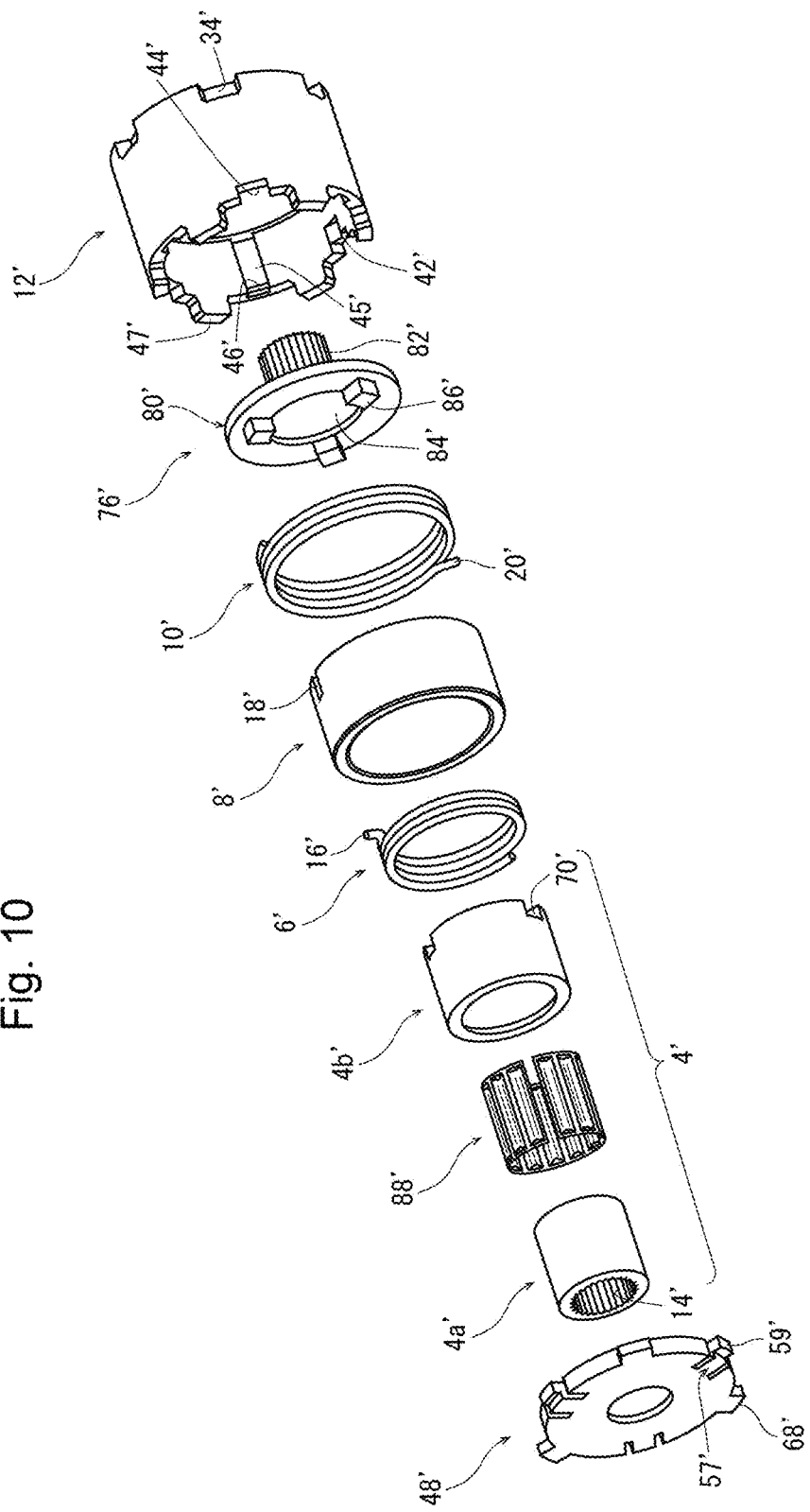
FIG. 10 is an exploded perspective view of the bidirectional torque limiter shown in FIGS. 9A-9D.
Figure 11A:
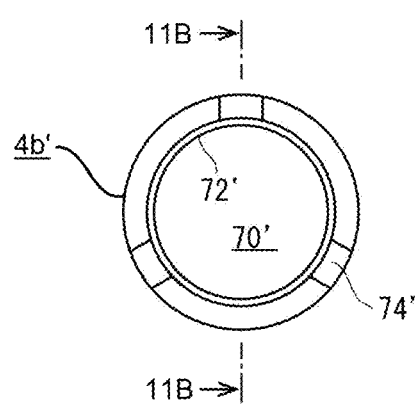
FIGS. 11A and 11B show the inner race external member of the bidirectional torque limiter shown in FIGS. 9A-9D.
Figure 11B:
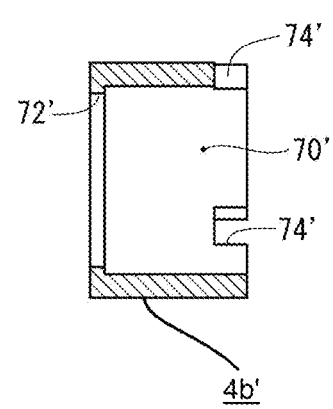

The following explanation is made referring to FIGS. 9A-10. An inner race 4' of the present embodiment has an inner race internal member 4a' and an inner race external member 4b', both of which are rotatable about a common central axis o' and each of which has an outer peripheral surface with a circular cross section. The inner race internal member 4a' is a cylindrical part, and internal teeth 14' for spline fitting are provided on the inner peripheral surface of the inner race internal member 4a'. A rotation shaft to be linked to an input-side device like an electric motor is to be coupled thereto. The following explanation is made referring also to FIGS. 11A and 11B. An inner race external member 4b' is also a cylindrical part where an internal space 70' having a circular cross section for housing the inner race internal member 4a' is formed. On the inner peripheral surface at the axial end portion of the inner race external member 4b', an annual ridge 72' protruding radially inward is formed. At the other axial end portion of the inner race external member 4b', three U-shaped notches 74' opened axially outward are formed at equiangular intervals circumferentially. A first coil spring 6' is mounted on the inner race external member 4b' to be in contact with the outer peripheral surface.

Figure 12C:
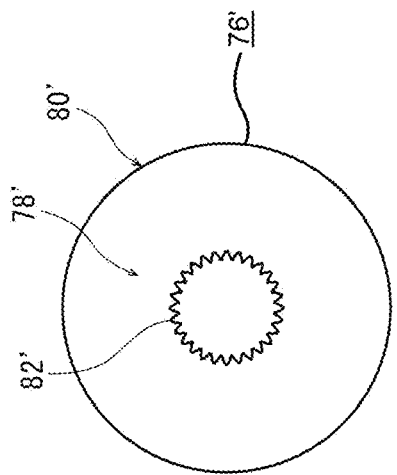
FIG. 12C is a right side view showing the connection member of the bidirectional torque limiter shown in FIGS. 9A-9D.
Figure 12B:
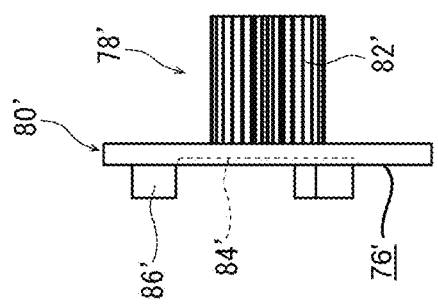
FIG. 12B is a plan view showing the connection member of the bidirectional torque limiter shown in FIGS. 9A-9D.
Figure 12A:
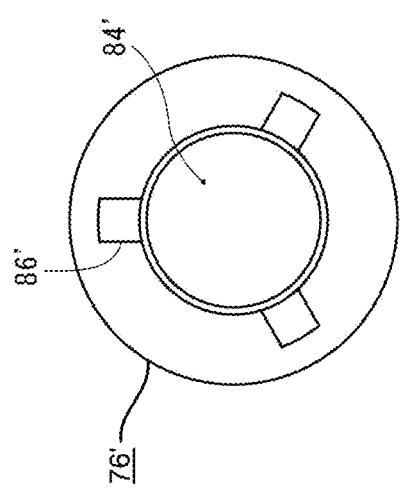
FIG. 12A is a left side view showing the connection member of the bidirectional torque limiter shown in in FIGS. 9A-9D.
Figure 13A:
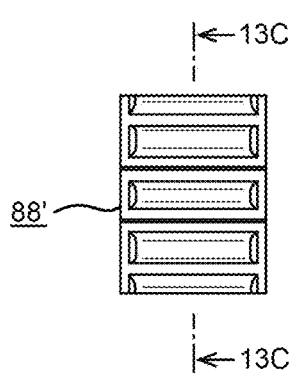
FIG. 13A is a plan view showing the thin-plate elastic piece of the bidirectional torque limiter shown in FIGS. 9A-9D.
Figure 13B:
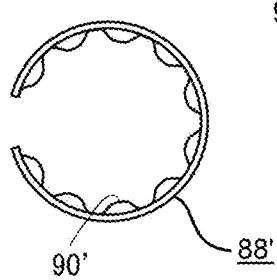
FIG. 13B is a left side showing the thin-plate elastic piece of the bidirectional torque limiter shown in FIGS. 9A-9D.
Figure 13C:
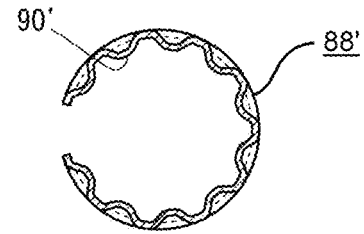
FIG. 13C is a cross sectional view along line 13C-13C of FIG. 13A.

In the present embodiment, the inner race external member 4b' is to be connected to an output-side device like a hatchback via a connection member 76' as shown in FIGS. 12A-12C. The connection member 76' has a shaft portion 78' to be connected to the output-side device and a circular flange portion 80' firmly fixed to the axial tip end of the shaft portion 78'. The shaft portion 78' and the flange portion 80' are coaxial with the common central axis o'. External teeth 82' for spline fitting are provided on the outer peripheral surface of the shaft portion 78', to which a rotation shaft to be linked to an output-side device like a hatchback is to be coupled. A circular central recessed portion 84' is formed in the central region of the flange portion 80'. Further in the flange portion 80', three external fitting protrusions 86' to fit the notches 74' formed on the inner race external member 4b' are formed. Here, the external fitting protrusions 86' are formed at equiangular intervals circumferentially along the outer peripheral edge of the central recessed portion 84'.

As shown in FIGS. 9A-9D, in the present embodiment, further a rolled thin-plate elastic piece 88' is interposed between the outer peripheral surface of the inner race internal member 4a' and the inner peripheral surface of the inner race external member 4b' so as to be in contact with both the inner peripheral surface and the outer peripheral surface. The thin-plate elastic piece 88' is formed by rolling a metal thin plate almost perfectly to have slight gap between two sides (i.e., C-shape) as shown in FIGS. 10 and 13A-13C. Preferably, its thickness with respect to the longitudinal length is in a range of 0.05 to 10%. In the illustrated embodiment, a plurality of ridge portions 90' are formed at longitudinal intervals on the metal thin plate by press work or the like. In the metal thin plate rolled in this manner, every ridge portion 90' protrudes radially inward. Once the thin-plate elastic piece 88' is disposed between the outer peripheral surface of the inner race internal member 4a' and the inner peripheral surface of the inner race external member 4b', the top of the ridge portion 90' gets contact with the outer peripheral surface of the inner race internal member 4a', and the bottom of the ridge portion 90' (outer peripheral portion of the thin-plate elastic piece 88') gets contact with the inner peripheral surface of the inner race external member 4b', thereby connecting the inner race internal member 4a' to the inner race external member 4b'. As can be understood by referring to the line 9B-9B cross section of FIG. 9B, the axial move of the thin-plate elastic piece 88' is restricted by the ridge 72' of the inner race external member 4b' and the flange portion 80' of the connection member 76', so that the thin-plate elastic piece 88' is capable of exhibiting stably functions as described below.

This thin-plate elastic piece is called also a tolerance ring, which is a part to be used also for attaching and fixing a flange-shaped circular board to the rotation shaft, and which generates a large elastic force with a small deformation. Therefore, even when the thin-plate elastic piece 88' is small, a large frictional force is generated between the inner race internal member 4a' and the inner race external member 4b', which enables to set the torque for rotating the inner race external member 4b' relatively (i.e., cut off) with respect to the inner race internal member 4a' to be sufficiently larger than the control torque applied by the first coil spring 6 and the second coil spring 10.

The next explanation is made for an outer race 12' with reference to FIGS. 14A-14D together with FIGS. 9A-10. The outer race 12' is a cup-shaped part consisting of a circular end plate portion 22' and a substantially cylindrical outer race main portion 24' connected to the outer peripheral edge of the end plate portion 22' and extending in the axial direction. A substantially columnar housing space portion is formed inside the outer race main portion 24', into which the intermediate race 8' attached with the second coil spring 10' is to be inserted. The end face opposite axially to the end plate portion 22' is open. In the present embodiment, similarly, it is preferable that a fluorine-based lubricant is encapsulated inside the outer race main portion 24'. At the center of the end plate portion 22', a circular through hole 26' is formed, in which a shaft portion 78' of the connection member 76' is to be inserted. At the outer peripheral edge portion of the end plate portion 22', a substantially cylindrical connection wall 32' extending opposite to the outer race main portion 24' when viewed in the axial direction is also provided. A plurality of recessed areas 34' are formed on the outer peripheral surface of the connection wall 32' at equiangular intervals in the circumferential direction (six recessed areas 34 are formed in the illustrated embodiment). The recessed areas 34' are used to fix the bidirectional torque limiter 2' itself to an external device.

The outer race main portion 24' is divided into a proximal end side portion 24a' having a relatively small inner diameter and an extending end side portion 24b' having a relatively large inner diameter. An annular shoulder surface 25' that is substantially perpendicular to the axial direction is formed at the border between the proximal end side portion 24a' and the extending end side portion 24b' on the inner peripheral surface of the outer race main portion 24'. At the extending end portion of the outer race main portion 24', three circumferential engaging recessed portions 44' are formed circumferentially at equiangular intervals. The circumferential engaging recessed portions 44' formed by displacing partly the extending end of the outer race main portion 24' axially inward are substantially rectangular when viewed from the side face. In one of the three circumferential engaging recessed portions 44', a second groove portion 42' is formed, into which a hook portion 20' of the second coil spring 10' is to be inserted and held therein. The second groove portion 42' extends linearly in the axial direction at the circumferential center of the circumferential engaging recessed portions 44'. On one of the circumferential side faces at the radially inside end portion of the second groove portion 42', a relief portion 43' is provided. The relief portion 43' serves to avoid interference with the proximal end portion of the second hook portion 20' when the second hook portion 20' is inserted in the second groove portion 42' and held therein. Between two of the circumferential engaging recessed portions 44' adjacent to each other in the circumferential direction, engaging claws 46' each protruding radially inward from the inner peripheral surface of the extending end portion of the outer race main portion 24' are formed. When viewed circumferentially, a thin portion 45' is provided to axially extend at each extending end side portion 24b' of the outer race main portion 24' in the angular region where the engaging claws 46' are formed. The thin portion 45' is formed by partly increasing the inner diameter of the outer race main portion 24'. Further, fixing bump portions 47' protruding axially outward are also formed at the extending end of the outer race main portion 24'. The fixing bump portions 47' are substantially rectangular when viewed from the side and extend in the circumferential direction. Each of the fixing bump portions 47' disposed between the engaging claw 46' and the circumferential engaging recessed portion 44' adjacent circumferentially to each other. The fixing bump portions 47' are used to fix the entire apparatus to an external device.

The open end portion of the outer race 12' is blocked with a shield plate 48'. The following explanation is made referring to FIGS. 15A-15C together with FIGS. 9A-10. The shield plate 48' has an end plate portion 50' that is entirely disc-shaped. A circular through hole 52' is formed at the center of the end plate portion 50'. On the end plate portion 50', three arc-shaped external wall 53' standing axially along the outer peripheral edge are formed circumferentially at equiangular intervals. Between two of the external walls 53' circumferentially adjacent to each other, recessed areas 55' are formed. These recessed areas 55' are formed by decreasing partly the outer diameter of the end plate portion 50'. At the recessed areas 55', protruding pieces 57' extending radially outward from the outer peripheral surface of the end plate portion 50' are formed. Each of the protruding pieces 57' has an arc-shaped extending edge. The protruding pieces 57' are connected to the end plate portion 50' only at the proximal ends, while the circumferential both side faces are distanced from the end plate portion 50'. Thereby, the protruding pieces 57' are imparted with sufficient flexibility with respect to the end plate portion 50'. An axially engaging protrusion 59' extending axially is provided at the extending end portion of the protruding piece 57'. The radially external end edge of each of the axially engaging protrusion 59' is positioned radially outside the outer peripheral edge of the external wall 53'. Circumferential engaging protrusions 68' each extending radially outward are also formed at the circumferential center of the outer peripheral surface of the external wall 53'.

For attaching the aforementioned shield plate 48' to the outer race 12', the shield plate 48' is pressed axially with respect to the outer race 12' in the state where the circumferential engaging protrusions 68' and the axial engaging protrusions 59' are made match the circumferential engaging recessed portions 44' and the engaging claws 46', respectively. In this way, the axial engaging protrusions 59' of the shield plate 48' get over elastically the engaging claws 46' of the outer race 12' and axially engage therewith. At this time, for the shield plate 48', the protruding pieces 57' having the axial engaging protrusions 59' have sufficient flexibility with respect to the end plate portion 50', and as for the outer race 12', a thin portion 45' is formed at the outer race main portion 24' where the engaging claws 46' are formed. Therefore, the axial engaging protrusions 59' of the shield plate 48' have a sufficient capability of getting over the engaging claws 46' of the outer race 12'. In the state where the shield plate 48' is attached to the outer race 12' as required, the circumferential engaging protrusions 68' fit into the circumferential engaging recessed portions 44', and thus, rotation of the shield plate 48' with respect to the outer race 12' is also restricted.

As shown in FIGS. 9A-10, the first coil spring 6', the intermediate race 8' and the second coil spring 10' in the present embodiment are all substantially the same as those of the bidirectional torque limiter 2 in the first embodiment of the present invention. Therefore, in the present embodiment, the first hook portion 16' of the first coil spring 6' and the second hook portion 20' of the second coil spring 10' are fixed to the intermediate race 8' and the outer race 12', respectively. In the present embodiment, as shown in FIG. 16, in the state where the second coil spring 10' is mounted on the outer peripheral surface of the intermediate race 8', the second coil spring 10' and the first groove portion 18' formed in the intermediate race 8' are distanced from each other when viewed axially.

Further, operations of the bidirectional torque limiter 2' will be explained below with reference to FIGS. 17A1, 17A2, 17B1 and 17B2.

As indicated with arrows in FIGS. 17A1 and 17A2, when the inner race internal member 4a' connected to an input-side device rotates counterclockwise (when viewed from the left in the line 17A2-17A2 cross section), the inner race external member 4b' connected via the thin-plate elastic piece 88', the first coil spring 6' mounted on the outer peripheral surface of the inner race external member 4b', the intermediate race 8' connected via the first hook portion 16' of the first coil spring 6', and the second coil spring 10' mounted on the outer peripheral surface of the intermediate race 8' start integrally rotating counterclockwise. At this time, the first hook portion 16' and the second hook portion 20' are pushed in the direction for clamping the first coil spring 6' and the second coil spring 10', respectively, for the same reason relative to the bidirectional torque limiter configured according to the present invention as described above in the first embodiment. This indicates that, when a rotation torque about the central axis for rotating counterclockwise the inner race internal member 4a' is applied and when the rotation torque is larger than the second control torque, the intermediate race 8' will rotate with respect to the second coil spring 10' by overcoming the frictional force between the second coil spring 10' and the intermediate race 8'. At this time, the second coil spring 10' and the first groove portion 18' formed in the intermediate race 8' are radially distanced from each other. Therefore, at the time the second coil spring 10' rotates with respect to the intermediate race 8', the axial end of the second coil spring 10' will not get caught in the first groove portion 18'. And this avoids unwanted torque fluctuations, abnormal noise, or vibration. Meanwhile, since the inner race external member 4b' is connected via the thin-plate elastic piece 88' to the inner race internal member 4a' with a holding torque larger than the second control torque, the inner race external member 4b' rotates counterclockwise integrally with the inner race internal member 4a'. As a result, a counterclockwise rotation is transmitted from the input-side device to the output-side device.

When the inner race internal member 4a' rotates clockwise, the aforementioned reactive force acts in a direction for loosening the first coil spring 6' and in a direction for clamping the second coil spring 10', respectively. This indicates that, as shown with respective arrows in FIGS. 17B1 and 17B2, at the time the rotation torque about the central axis for rotating clockwise the inner race external member 4b' is applied and the rotation torque is larger than the first control torque, the inner race external member 4b' will rotate with respect to the first coil spring 6' by overcoming the frictional force between the first coil spring 6' and the inner race external member 4b'. In this case, since the inner race external member 4b' is connected to the inner race internal member 4a' with a holding torque larger than the first control torque via the thin-plate elastic piece 88', the inner race external member 4b' rotates clockwise integrally with the inner race internal member 4a'. In this manner, a clockwise rotation is transmitted from the input-side device to the output-side device.

In the process of opening/closing the hatchback by the electric motor, an obstacle may be caught between the hatchback and the vehicle, causing the hatchback to stop abnormally, for instance, and a rotation torque larger than the third predetermined value may be applied from the input-side device about the central axis o in the one or the other direction. In this case, the connection between the inner race internal member 4a' and the inner race external member 4b' by the thin-plate elastic piece 88' may be cut off, and the inner race internal member 4a' and the inner race external member 4b' will rotate relatively. Namely, slippage may occur between the inner race internal member 4a' and the inner race external member 4b', whereby the inner race external member 4b' will rotate while the inner race internal member 4a' remains stopped. This prevents overload on the electric motor as the drive source.

Therefore, the bidirectional torque limiter 2' of the present embodiment can exhibit effects similar to those of the aforementioned bidirectional torque limiter 2 of the first embodiment. The bidirectional torque limiter 2' is provided also with an overload prevention mechanism.

In the aforementioned bidirectional torque limiter 2', the inner race internal member and the inner race external member are connected to the input-side device and the output-side device, respectively. The input-output relationship is not limited to this example, but the inner race internal member and the inner race external member can be connected to the output-side device and the input-side device, respectively. Further in the aforementioned embodiment, any one of the inner race internal member and the inner race external member is connected to the input-side device, while the other is connected to the output-side device. Alternatively, just like the first embodiment of the present invention, a drive shaft extending from the input-side device can be connected to the output-side device via the bidirectional torque limiter 2'.

It should be noted that application of the bidirectional torque limiter of the present invention is not limited to a switching mechanism for opening and closing a hatchback as an output-side device by use of an electric motor as an input-side device, but it can be used as any components for various apparatuses. For instance, it can also be applied to an automatic switching mechanism of a toilet seat or lid of a toilet, which is rotatably supported by a hinge, and an automatic switching mechanism of a lid of printer. Further, the linkage is not limited to an output-side device supported by a hinge. When a rotary/linear motion converter (for instance, an apparatus that converts the rotation of a gear into a linear motion by rack) is coupled to the inner race 4, it can be used as a position holding apparatus of a device such as a slide door that performs a linear motion.

The present invention is not limited to the aforementioned embodiments detailed with reference to the attached drawings for the bidirectional torque limiter of the present invention. For instance, in the illustrated embodiments, the spline gear 14 used to connect the inner race 4 and an external device (a drive shaft extending from a drive source in the aforementioned embodiment) can be replaced by any suitable connection means such as connection using a key and a key groove.

EXPLANATIONS OF LETTERS OR NUMERALS

2: Bidirectional torque limiter
4: Inner race
6: First coil spring
8: Intermediate race
10: Second coil spring
12: Outer race
16: First hook portion
18: First groove portion
20: Second hook portion
42: Second groove portion

The invention claimed is:

1. A bidirectional torque limiter comprising:
an inner race;
a first coil spring formed of a wound wire mounted on the inner race so as to be in contact with an outer peripheral surface of the inner race,
a tubular intermediate race into which the inner race mounted with the first coil spring is to be inserted,
a second coil spring formed of a wound wire mounted on the intermediate race so as to be in contact with an outer peripheral surface of the intermediate race, and
a tubular outer race into which the intermediate race mounted with the second coil spring is to be inserted;
wherein the inner race, the intermediate race and the outer race have a common central axis;
the first coil spring has a first hook portion to be fixed to the intermediate race in a manner incapable of rotating relatively, so that the first coil spring is incapable of rotating with respect to the intermediate race;
the second coil spring has a second hook portion to be fixed to the outer race in a manner incapable of rotating relatively, so that the second coil spring is incapable of rotating with respect to the outer race;
a direction to loosen the clamping force of the first coil spring by circumferentially pushing the first hook portion is opposite to a direction to loosen the clamping force of the second coil spring by circumferentially pushing the second hook portion when viewed from an axial direction; and
in a case where a rotation torque about the central axis to rotate the inner race in one direction with respect to the outer race is applied and when the rotation torque is larger than a first predetermined value, the inner race rotates with respect to the intermediate race by overcoming the frictional force between the first coil spring and the inner race; and in a case where a rotation torque about the central axis to rotate the inner race in an opposite direction with respect to the outer race is applied and when the rotation torque is larger than a second predetermined value, the intermediate race rotates with respect to the outer race by overcoming the frictional force between the second coil spring and the intermediate race.

2. The bidirectional torque limiter according to claim 1, wherein
the intermediate race has a first groove portion into which the first hook portion is to be inserted and held; and
the outer race has a second groove portion into which the second hook portion is to be inserted and held.

3. The bidirectional torque limiter according to claim 2, wherein the wire composing the first coil spring has an outer diameter larger than the circumferential width of the first groove portion, and the first hook portion is press-fitted into the first groove portion.

4. The bidirectional torque limiter according to claim 2, wherein the wire composing the second coil spring has an outer diameter larger than the circumferential width of the second groove portion, and the second hook portion is press-fitted into the second groove portion.

5. The bidirectional torque limiter according to claim 2, wherein the second coil spring and the first groove portion are distanced from each other when viewed axially.

6. The bidirectional torque limiter according to claim 1, wherein any one of the first predetermined value and the second predetermined value is set larger than the other.

7. The bidirectional torque limiter according to claim 1, wherein a fluorine-based lubricant is encapsulated inside the outer race.

8. The bidirectional torque limiter according to claim 1, wherein
the inner race comprises an inner race internal member and an inner race external member both of which are rotatable about the common central axis and each of which has an outer peripheral surface with a circular cross section;
the inner race external member has an internal space with a circular cross section for housing the inner race internal member, and a rolled thin-plate elastic piece is interposed between the outer peripheral surface of the inner race internal member and the inner peripheral surface of the inner race external member such that the thin-plate elastic piece is brought into contact with both the inner peripheral surface and the outer peripheral surface;
the inner race internal member and the inner race external member rotate integrally in a case where a rotation torque smaller than a third predetermined value is applied between the inner race internal member and the inner race external member;
the inner race internal member rotates with respect to the inner race external member in a case where a rotation torque larger than the third predetermined value is applied between the inner race internal member and the inner race external member; and
the third predetermined value is larger than the first predetermined value and the second predetermined value.

* * * * *